United States Patent [19]
Morimoto et al.

[11] Patent Number: 5,147,897
[45] Date of Patent: Sep. 15, 1992

[54] METHOD FOR PRODUCING NON-YELLOWING POLYURETHANE UREA FOAM

[75] Inventors: Kiyotake Morimoto, Koshigaya; Yasushi Takagi, Tokyo; Isao Kato, Tokyo; Masahiko Nakata, Tokyo, all of Japan

[73] Assignee: Nisshinbo Industries, Inc., Tokyo, Japan

[21] Appl. No.: 749,600

[22] Filed: Aug. 26, 1991

[30] Foreign Application Priority Data

Aug. 27, 1990 [JP] Japan ............................ 2-222386
Jan. 11, 1991 [JP] Japan ............................ 3-12554

[51] Int. Cl.$^5$ ................................................ C08J 9/00
[52] U.S. Cl. .................................... 521/125; 521/129; 521/159
[58] Field of Search ........................ 521/125, 129, 159

[56] References Cited

U.S. PATENT DOCUMENTS

| | | | |
|---|---|---|---|
| 3,897,581 | 7/1975 | Nakatsuka et al. | 521/159 |
| 3,919,173 | 11/1975 | Coyner et al. | 521/159 |
| 4,189,542 | 2/1980 | Kleimann et al. | 521/159 |
| 4,689,353 | 8/1987 | Harris | 521/159 |

*Primary Examiner*—Morton Foelak
*Attorney, Agent, or Firm*—Wenderoth, Lind & Ponack

[57] ABSTRACT

A method for producing a non-yellowing polyurethane urea foam, which comprises reacting an isocyanate-terminated prepolymer, obtained by the addition reaction of a polyol having a number average molecular weight of 100 to 5,000 and containing on the average 2 to 3 functional groups with an aliphatic polyisocyanate in an amount of 1.4 to 2.6 times the hydroxyl equivalent, with water in an amount of 0.4 to 5 times the isocyanate equivalent in the presence of, per 100 parts by weight of the prepolymer, 0.1 to 5 parts by weight of a carboxylic acid metal salt or 0.1 to 10 parts by weight of an amine-type catalyst.

7 Claims, No Drawings

METHOD FOR PRODUCING NON-YELLOWING POLYURETHANE UREA FOAM

This invention relates to a method for producing a non-yellowing polyurethane urea foam useful as a material for use in the fields of medical care, sanitation, clothing, food packaging, etc.

In recent years, polyurethanes have found wide acceptance in various fields as resilient materials, foams, adhesives, etc. Especially when used in the fields of medical care, sanitation, clothing and food packaging, the polyurethanes are required to have a non-yellowing property.

The polyurethanes are usually produced by reacting polyisocyanates with polyols in the presence of a hardening catalyst such as amines, organometallic compounds, metallic salts, etc. The metallic salts, especially, potassium and sodium salts, of aliphatic acids are known as a catalyst for trimerization of isocyanate groups, but they are generally lower in activity as a urethanization catalyst than the amines and the organometallic compounds; the conjoint use with other catalysts is needed to give a high hardening rate. Moreover, the resulting polyurethanes are brittle and less flexible.

Regarding the isocyanates, polyurethanes using aromatic isocyanates employed as a polyurethane starting material, such as diphenylmethane diisocyanate (MDI) and tolylene diisocyanate (TDI), generally are caused to yellow by light or oxygen. The yellowing property can be avoided by using aliphatic polyisocyanates as an isocyanate component.

As a method for producing a non-yellowing polyurethane foam, there has been so far proposed a method for producing a polyurethane foam by a so-called "one-shot process" wherein an aliphatic polyisocyanate, a polyol, a hardening catalyst and water are mixed, and the mixture is stirred and hardened (see, e.g., Japanese Patent Publication No. 30437/1977, Japanese Laid-open Patent Application No. 128994/1977, Japanese Patent Publication No. 15599/1979, and Japanese Laid-open Patent Application No. 255817/1990). However, according to the one-shot process, a reaction heat in the hardening reaction is greater than in that which is called a "prepolymer process" in which a prepolymer obtained by previously adding a polyisocyanate to a polyol is hardened. Accordingly, when producing a large foam by the one-shot process, the temperature inside the foam is excessively elevated, the reaction is hardly controlled and, for example, burning occurs at times inside the foam, making it difficult to obtain a uniform, high-quality foam.

The aliphatic isocyanate is, as stated above, generally lower in reactivity than the aromatic isocyanate. When said aliphatic isocyanate is formed into a prepolymer, mobility of molecules further decreases, which leads to further decrease in reactivity. For this reason, production of a polyurethane foam by the prepolymer process using the aliphatic isocyanate has not been hitherto employed.

The present inventors have made extensive studies about a method for producing a polyurethane foam by a prepolymer process using an aliphpatic isocyanate without the aforesaid defects, and have consequently found that when a prepolymer having isocyanate groups in substantially all molecule terminals and obtained by addition-reacting a polyol having a specific molecular weight and a specific number of functional groups with an aliphatic polyisocyanate at a specific ratio, is used and reacted with a specific proportion of water, hardening occurs rapidly even in the presence of a carboxylic acid metal salt or an amine-type catalyst and a non-yellowing high-quality foam having excellent mechanical properties results. These findings have led to completion of this invention.

Thus, according to this invention, there is provided a method for producing a non-yellowing polyurethane urea foam, which comprises reacting an isocyanate-terminated prepolymer, obtained by the addition reaction of a polyol having a number average molecular weight of 100 to 5,000 and containing on the average 2 to 3 functional groups with an aliphatic polyisocyanate in an amount of 1.4 to 2.6 times the hydroxyl equivalent, with water in an amount of 0.4 to 5 times the isocyanate equivalent in the presence of, per 100 parts by weight of the prepolymer, 0.1 to 5 parts by weight of a carboxylic acid metal salt or 0.1 to 10 parts by weight of an amine-type catalyst.

The method of this invention will be described in more detail below.

The aliphatic polyisocyanate used to prepare the isocyanate-terminated prepolymer which is employed in this invention may be either a compound composed only of an aliphatic chain or an alicyclic compound or a compound with an aromatic ring present in an aliphatic chain. Concrete examples thereof are hexamethylene diisocyanate, hexamethylene triisocyanate, bicycloheptane triisocyanate, undecanetriisocyanate, lysine ester triisocyanate, isophorone diisocyanate, dicyclohexylmethane diisocyanate, methylcyclohexane diisocyanate, dimethylcyclohexane diisocyanate, xylylene diisocyanate, tetramethylxylylene diisocyanate, their dimers, and their trimers. Of these, hexamethylene diisocyanate is especially preferable.

Meanwhile, the polyol employed to form the prepolymer using the aliphatic polyisocyanate is a polyol having a number average molecular weight of 100 to 5,000, preferably 200 to 3,000, and containing on the average 2 to 3 functional groups. In case the number average molecular weight of the polyol is less than 100, a ratio of a hydrophobic portion of the prepolymer becomes high when forming the prepolymer by adding the polyisocyanate, and miscibility with water being reacted thereto becomes poor, making it hard to advance the hardening reaction. On the other hand, when the number average molecular weight exceeds 5,000, a density of the terminal isocyanate group of the prepolymer becomes low, the reaction frequency decreases and the hardening reaction proceeds slowly.

Examples of the polyol useful in this invention include polyether polyols such as adducts [e.g., polyethylene oxide, polypropylene oxide, and poly(ethylene oxide-propylene oxide) copolymer] of dihydric or trihydric alcohols (e.g., ethylene glycol, propylene glycol, glycerol, hexanetriol, and triethanolamine) and alkylene oxides (e.g., ethylene oxide, propylene oxide, and butylene oxide), and polytetramethylene ether glycol obtained by subjecting tetrahydrofuran to ring opening polymerization; lactone-type polyester polyols obtained by adding lactons such as caprolactone, glycolide and lactide to the above dihydric or trihydric alcohols via ring opening; compounds obtained by condensing the above dihydric or trihydric alcohols with hydroxycarbonic acids such as glycolic acid, lactic acid, and salicylic acid; compounds obtained by condensing dicarboxylic acids such as oxalic acid, maric acid, succinic acid, glutaric acid, phthalic acid, and adipic acid with diols such as ethylene glycol, and propylene glycol; and condensed polyester polyols obtained by adding acid anhydrides such as phthalic anhydride with diols.

The prepolymer can be prepared from the aliphatic polyisocyanate and the polyol in a manner known per se by the addition reaction of them. Regarding the reaction ratio of the polyisocyanate and the polyol at that time, it is important that an NCO/OH ratio is 1.4 to 2.6, preferably 1.5 to 2.5. When the ratio is less than 1.4, the obtained prepoplymer tends to have a high-molecular weight, and a viscosity increases making hard the stirring and mixing in hardening. Meanwhile, when the ratio exceeds 2.6, the reaction of the hydrophobic aliphatic polyisocyanate monomer left in the resulting prepolymer, water and the prepolymer non-uniformly advances because of difference in affinity for water, and the hardened product is much liable to become non-uniform.

When the NCO/OH ratio is 2 or higher, the unreacted aliphatic polyisocyanate remains in the prepolymer. On this occasion, the remaining polyisocyanate monomer may be removed partially or substantially all from the prepolymer, or may be left in the prepolymer.

Thus, the prepolymer having the isocyanate groups in substantially all the molecule terminals results.

According to this invention, the prepolymer is reacted with water in the presence of the hardening catalyst. The hardening reaction proceeds by chain extension accompanying a urea bond that occurs by reacting an amino group resulting from the reaction of the terminal isocyanate group of the prepolymer and water with the terminal isocyanate group of the other prepolymer.

The amount of water used in the reaction can be 0.4 to 5 times, preferably 0.5 to 4.5 times the isocyanate equivalent of the prepolymer. When the amount of water is less than 0.4 times, many unreacted isocyanate groups remain, and a good foam cannot be obtained. When it exceeds 5 times, the isocyanate-terminated prepolymer molecules being reacted become absent in the vicinity of the amino-terminated prepolymer molecules formed by the reaction of the isocyanate group and water, and the chain extension reaction is not sufficiently performed, so that only the non-uniform hardened product results.

In accordance with one aspect of this invention in which the polyurethane urea foam is formed by the reaction of the isocyanate-terminated prepolymer and water, it has been found that said reaction can of course be carried out by using a highly active hardening catalyst such as amines or organometallic compounds; even using the carboxylic acid metal salts of low toxicity, the hardening reaction rapidly proceeds, and a less toxic non-yellowing polyurethane foam is obtained.

Examples of the carboxylic acid metal salt are alkali metal salts, lead salts, alkaline earth metal salts, especially calcium salts, of aliphatic carboxylic acids which are $C_2$–$C_{10}$ alkane acids such as acetic acid, propionic acid, butyric acid, valeic acid, caproic acid, caprylic acid, capric acid, and 2-ethylhexanoic acid. Of these, the calcium or sodium salts are preferable. The amount of the carboxylic acid metal salt can be 0.1 to 5 parts by weight, preferably 1 to 3 parts by weight per 100 parts by weight of the prepolymer. When the amount of the carboxylic acid metal salt is less than 0.1 part by weight, the hardening reaction does not proceed rapidly. When it is more than 5 parts by weight, the hardening reaction proceeds too rapidly, and the uniform hardened product is little obtained.

When producing a foam in the use wherein toxicity is not a serious problem, the carboxylic acid metal salt can also be used conjointly with a usual urethanization catalyst. Examples of the usual urethanization catalyst include monoamines such as triethylamine, and dimethylcyclohexylamine; diamines such as tetramethylethylenediamine and tetramethylhexanediamine; triamines such as tetramethylguanidine; cyclic amines such as triethylenediamine, dimethylpiperadine, and methylmorphorine; alcoholamines such as dimethylaminoethanol, trimethylaminoethylethanolamine, and hydroxyethylmorphorine; ether amines such as bisdimethylaminoethyl ether; organotin compounds such as stannous octoate, dibutyltin diacetate, and dibutyltin dilaurate; and organolead compounds such as lead octenate.

In accordance with another aspect of the method of this invention, formation of the polyurethane urea foam by the reaction of the isocyanate-terminated prepolymer and water can also be conducted in the presence of an amine-type catalyst.

The amine-type catalyst can be an amine-type catalyst well known in the urethane field; a tertiary amine is especially preferable.

Examples of the tertiary amine include monoamines such as triethylamine, and dimethylcyclohexylamine; diamines such as tetramethylethylenediamine, and tetramethylhexanediamine; triamines such as tetramethylguanidine; cyclic amines such as triethylenediamine, dimethylpiperadine, and methylmorphorine; alcoholamines such as dimethylaminoethanol, trimethylaminoethylethanolamine, and hydroxyethylmorphorine; ether amines such as bisdimethylaminoethyl ethanol; diazabicycloalkenes such as 1,5-diazabicyclo(5,4,0)undecene-7 (DBU), and 1,5-diazabicyclo(4,3,0)nonene-5; and organic acid salts of the diazabicycloalkenes such as phenol salt, 2-ethylhexanoate and formate of DBU. Of these, a diazabicycloalkene represented by formula (I)

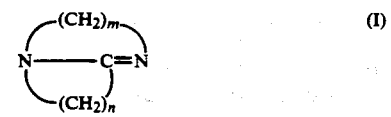

wherein m is an integer of 3 to 7, and n is an integer of 2 to 4, and a salt of it and an organic acid are especially preferable. These amines can be used either singly or in combination.

The amine-type catalyst can be used in an amount of usually 0.1 to 10 parts by weight, more preferably 0.4 to 4 parts by weight. When the amount of the amine-type catalyst is less than 0.1 part by weight, the hardening reaction does not proceed rapidly. When said amount is more than 10 parts by weight, it is uneconomical, and the hardening reaction proceeds too rapidly, making difficult the formation of the uniform hardened product.

In the method of this invention, two or more prepolymers different in isocyanate portion and/or polyol portion may be mixed and used, or the aforesaid polyol having the average molecular weight of 100 to 5,000 and containing on the average 2 to 3 functinal groups may be added to the hardening reaction system, as required. This enables modification of a viscosity of an expansion starting solution composed of a prepolymer, water, a catalyst, etc., increase in compatibility thereof and control of properties of the hardened product. Even in the method of this invention that conducts the chain extension chiefly by the formation of the urea bond via the reaction of the isocyanate group and water, the polyol can be incorporated into the hardened product by the formation of the urethane bond via the reaction of the hydroxyl group and the isocyanate group. The amount of the polyol can be usually 60% or less, preferably 50% or less. When the amount is more than 60%, the reaction rate decreases, making it hard to obtain the hardened foam.

In the method of this invention as well, additives such as a foam stabilizer, a blowing agent, a fire retardant, a chain extender, a crosslinking agent and a filler may be properly added as is often the case with production of ordinary polyurethanes.

Moreover, in order to react the remaining isocyanate groups left after expansion, the foam may be heated to conduct post-hardening.

The polyurethane urea foam produced by the method of this invention shows good dynamic properties even if not containing an aromatic ring, so far as the hard segment composed of the urea bond and/or the urethane bond and the soft segment composed of the polyol component and the methylene chain are well-balanced. A foam having better dynamic properties can also be formed, as required, by using as an aliphatic polyisocyanate or a polyol a compound having in a molecule an aromatic ring, an urethane bond, an urea bond and an ester linkage that can constitute a hard segment.

The polyurethane urea foam produced by the method of this invention is, compared to the ordinary polyurethane foam using the aromatic isocyanate, characterized in that it does not yellow, and provides a merit that compared to the polyurethane foam using the aliphatic isocyanate, the large foam can easily be obtained under the mild blowing conditions. The foam provided by this invention can be employed in the use requiring non-yellowing property, e.g. clothing materials such as a shoulder pad, and a brassiere pad, or in the use in direct contact with human body or food, requiring low toxicity when using the carboxylic acid salt, e.g., materials for medical care such as a gypsum and an elastic bandage, and cushioning materials for food package.

This invention will be described more specifically below by the following Examples and Comparative Examples.

EXAMPLES 1 to 3 and COMPARATIVE EXAMPLES 1 to 2

(A) Production of a prepolymer

Into a four-necked flask fitted with a reflux condenser was charged 336.4 g of HDI (a trade name for hexamethylene diisocyanate made by Nippon Polyurethane Industries Co., Ltd.) which was then heated at 80° C. and stirred. Four-hundred grams of CARBOWAX #400 (a trade name for polyethylene glycol made by Kokusan Chemical Works; an average molecular weight 400) was added dropwise over a period of 3 hours (an NCO/OH equivalent ratio =2). After the addition, stirring further continued at 80° C. for 6 hours to obtain a prepolymer A.

The above procedure was repeated except using as a polyol, instead of CARBOWAX #400, SANNIX GL-3000 (a trade name for a trifunctional polyether polyol made by Sanyo Chemical Industries, Ltd.), SANNIX PP-400 (a trade name for a difunctional polyether polyol made by Sanyo Chemical Industries, Ltd.; an average molecular weight 400), PLACCEL 205AL (a trade name for a difunctional polyester polyol made by Daicel Chemical Industries, Ltd., or PHAN TOL PL-305 (a trade name for a difunctional polyester polyol made by Toho Rika Kogyo Kabushiki Kaisha; an average molecular weight 350). There resulted prepolymers B, C, D and E.

Further, the above procedure was repeated except using, instead of HDI, DESMODUR W (a trade name for dicyclohexylmethane-4,4'-diisocyanate made by Sumitomo Bayer Urethane Co., Ltd.) in the same molar amount. There resulted a prepolymer F.

Still further, prepolymers G and H were produced as above by reacting SANNIX pp-400 with HDI at an NCO/OH equivalent ratio of 1.5 or 2.5.

(B) Preparation of a catalyst and a foam stabilizer

One part by weight of potassium octoate was dissolved in 1 part by weight of TG-400 (a trade name for a polyether polyol made by Mitsui Nisso Co., Ltd.) to obtain a catalyst M. One part by weight of sodium acetate was dissolved in 1 part by weight of water to obtain a catalyst N.

SILICONE OIL L-5430 (a trade name for a product made by Nippon Unicar Co., Ltd.) or SH-193 (a trade name for a product made by Toray Dow Corning Silicone K.K.) was prepared as a foam stabilizer.

(C) Production of a polyurethane urea foam

Water, a catalyst and a foam stabilizer were added to the resulting aliphatic isocyanate-terminated prepolymer to conduct expansion at room temperature (25° C.).

In Examples 1 to 3, 10 g of the prepolymer A was taken in a cap, and the catalyst, the foam stabilizer and water were added in amounts shown in Table 1. They were stirred by a cage-like mixer at 2,000 rpm for 10 seconds. The amount of water added was equal to the isocyanate equivalent in Example 1, 4.5 times the isocyanate equivalent in Example 2 and 0.8 time the isocyanate equivalent in Example 3.

The resulting mixture was held between two glass sheets spaced apart at 1 mm by a spacer, and hardened therebetween to obtain an expanded sheet-like sample. During this, a hardening time was measured. The "hardening time" here means a time that lapses until a foam rising by the hardening reaction becomes tack-free. The tensile test of the hardened product was conducted. The pulling rate was 10 cm/min.

In Comparative Example 1, the same starting materials as in Example 1 were hardened as in Example 1 except that a one-shot process was used instead of the prepolymer process. That is, 5.4 g of CARBOWAX #400 instead of 10 g of the prepolymer A, 4.5 g of HDI, 0.24 g of water and 0.5 g of the catalyst M were mixed, stirred, and hardened. In Comparative Example 2, chain extension by a urethane bond was conducted instead of chain extension by a urea bond. That is, the hardening by the urethane bond was carried out as in Example 1 except that 0.9 g of ethylene glycol and 0.5 g of the catalyst M were added to the prepolymer A.

The results are shown in Table 1.

TABLE 1

| | Formulation | | | | | | |
|---|---|---|---|---|---|---|---|
| | Prepolymer | Water (g) | Catalyst M (g) | Silicone L-5430 (g) | Hardening time (sec.) | Break strength (kg/cm$^2$) | Elongation at break (%) | Density (g/cm$^3$) |
| Example | | | | | | | | |
| 1 | A | 0.24 | 0.1 | 0.5 | 120 | 17.8 | 104 | 0.43 |
| 2 | A | 1.08 | 0.1 | 0.5 | 80 | 21.0 | 50 | 0.57 |
| 3 | A | 0.20 | 0.5 | 0.5 | 30 | 34.3 | 208 | 0.62 |
| Comparative Example | | | | | | | | |
| 1 | One-shot process | 0.24 | 0.5 | 0.5 | 40 | The hardened product is powdery and yellows by reaction heat. | | |
| 2 | A | — | 0.5 | 0.5 | 30 min. | The hardened product is brittle. | | |

EXAMPLES 4 to 12

Four-hundred grams of the prepolymer was charged in a cup, and water, a catalyst, a polyol (SANNIX GL-3000) and a foam stabilizer were added in amounts shown in Table 2, followed by mixing them by a cage-like mixer at 2,000 rpm for 20 seconds. The mixture was placed in a cubic box having a side of 25 cm, expanded and hardened.

The hardening time, and the core density and the state of the resulting foam are shown in Table 2.

205AL (a trade name for a difunctional polyester polyol made by Daicel Chemical Industries, Ltd.; a number average molecular weight 500), or SANNIX PP-1000 (a trade name for a difunctional polyol made by Sanyo Chemical Industries, Ltd.; a number average molecular weight 1,000) were used.

Still further, in the same way as above, prepolymers M and N were produced by reacting SANNIX PP400 with HDI at a NCO/OH equivalent ratio of 1.5 or 2.5.

(B) Preparation of a catalyst and a foam stabilizer

TABLE 2

| | Formulation | | | | | | | | |
|---|---|---|---|---|---|---|---|---|---|
| | Prepolymer 400 g | NCO/OH | Water (g) | Catalyst M (g) | Catalyst N (g) | GL-3000 (g) | Foam stabilizer (g) | Hardening time (sec.) | Core density (g/cm$^3$) | State of the foam |
| Example | | | | | | | | | | |
| 4 | B | 2 | 3.1 | 20 | — | — | 4 | 180 | 0.042 | good |
| 5 | C | 2 | 9.8 | 20 | — | — | 4 | 100 | 0.045 | good |
| 6 | D | 2 | 8.6 | 20 | — | — | 4 | 100 | 0.066 | good |
| 7 | E | 2 | 10.4 | 20 | — | — | 4 | 120 | 0.060 | good |
| 8 | F | 2 | 7.9 | 20 | — | — | 4 | 300 | 0.085 | good |
| 9 | A | 2 | —* | — | 20 | — | 4 | 300 | 0.080 | good |
| 10 | E | 2 | 8.6 | 20 | — | 100 | 4 | 120 | 0.075 | good |
| 11 | G | 1.5 | 5.5 | 20 | — | — | 4 | 120 | 0.050 | good |
| 12 | H | 2.5 | 13.2 | 20 | — | — | 4 | 120 | 0.062 | good |

*Water contained in the catalyst N is fed.

EXAMPLES 13 to 24 and COMPARATIVE EXAMPLES 3 to 4

(A) Production of a prepolymer

Into a four-necked flask fitted with a reflux condenser were charged 336.4 g of HDI (a trade name for 1,6-hexamethylene diisocyanate made by Nippon Polyurethane Industry Co., Ltd.) and 400 g of SANNIX PP400 (a trade name for polypropylene glycol made by Sanyo Chemical Industries, Ltd.; a number average molecular weight 400) at an NCO/OH equivalent ratio of 2, and the mixture was heated at 100° C. with stirring. After a while, the temperature in the inside of the system was raised owing to the exothermic reaction, but when the reaction was over, the temperature in the inside of the system was lowered. When the temperature was lowered up to 120° C., stirring continued at a fixed temperature of 120° C. for 4 hours to obtain a prepolymer I. The theoretical amount of NCO of the prepolymer I was 11.4%, while the found value thereof by a dibutylamine method was 10.9%.

Further, prepolymers J, K and L were produced as above except using as a polyo-1, instead of SANNIX pp400, SANNIX GL-3000 (a trade name for a functional polyol made by Sanyo Chemical Industries, Ltd.; a number average molecular weight 3,000), PLACCEL DBU (a trade name for 1,5-diazabicyclo(5,4,0)-undecene-7 made by San-Apro Ltd.), SA-102 (a trade name for DBU 2-ethylhexanoate made by San-Apro Ltd.), SA-1 (a trade name for DBU phenolate made by San-Apro Ltd.), or DBN (a trade name for 1,5-diazabicyclo(4,3,0)none-5 made by San-Apro Ltd.) was prepared as a catalyst.

SH-193 (a trade name for a product made by Toray Dow Corning Silicone K.K.) was prepared as a foam stabilizer.

(C) Production of a polyurethane urea foam

Water, a catalyst and a foam stabilizer were added to the aliphatic isocyanate-terminated prepolymer obtained in (A), and expansion was conducted. The mixture was stirred with a cage-like mixer at 2,000 rpm for 10 seconds. The expansion was all conducted at room temperature (25° C.).

In Examples 13 to 16, 100 g of the prepolymer A was taken in a cup, and water, a catalyst, a polyol and a foam stabilizer were added in amounts shown in Table 3. The amount of water added was equal to the isocyanate equivalent in Example 13, 4.4 times the isocyanate equivalent in Example 14, and 0.5 time the isocyanate equivalent in Example 15. In Example 16, hardening was conducted with the formulation shown in Table 2.

The amount of PEG400 added was 0.5 time the isocyanate equivalent. The hardening rate and the core density of the resulting foam are shown in Table 3.

In Examples 17 to 19, the hardening was conducted in the presence of a catalyst different from that of Example 13. Water and a foam stabilizer previously dissolved in GL-3000 [a water/GL-3000 ratio=1/5 (weight ratio), an SH-193/GL-3000 ratio=¼ (weight ratio )] were added. The formulation, the hardening time, and the hardening rate and the core density of the resulting foam are shown in Table 4.

In Examples 20 to 22, the hardening was conducted using a prepolymer formed from a polyol different from that of Example 13. Water and a foam stabilizer previously dissolved in SANNIX GL-3000 [a water/GL-3000 ratio=1/5 (weight ratio), an SH-193/GL-3000 ratio=¼ (weight ratio)] were added. The formulation, the hardening time, and the core density and the state of the resulting foam are shown in Table 4.

In Examples 23 and 24, the hardening was conducted using a prepolymer obtained by changing a HDI/PP400 ratio at the time of forming the prepolymer in Example 13. Water and a foam stabilizer previously dissolved in SANNIX GL-3000 [a water/GL-3000 ratio=1/5 (weight ratio), an SH-193/GL-3000 ratio=¼ (weight 25 ratio)] were added. The formulation, the hardening time, and the hardening rate and the core density of the resulting foam are shown in Table 4.

In Comparative Example 3, the same starting materials as in Example 13 were hardened as in Example 13 except using a one-shot process instead of the prepolymer method. That is, the hardening was conducted with the formulation shown in Table 3 using SANNIX PP-400 and HDI instead of 100 g of the prepolymer by the one-shot method, not by the prepolymer method. In Comparative Example 4, chain extension by a urethane bond was conducted instead of chain extension by a urea bond. That is, ethylene glycol in an amount equal to the socyanate equivalent was added, instead of water, to the prepolymer A, and hardening was carried out with the formulation shown in Table 3. The results are shown in Table 3.

TABLE 3

| | Example | | | | Comparative Example | |
|---|---|---|---|---|---|---|
| | 13 | 14 | 15 | 16 | 3 | 4 |
| Formulation | | | | | | |
| Prepolymer-I (g) | 100 | 100 | 100 | 100 | — | 100 |
| Water (g) | 2.44 | 12.2 | 1.22 | 1.22 | 2.44 | — |
| SA-102 (g) | 0.5 | 3.5 | 2.0 | 3.5 | 0.5 | 3.5 |
| SH-193 (g) | 0.2 | 0.2 | 0.2 | 0.2 | 0.2 | 0.2 |
| GL-3000 (g) | — | — | — | — | — | — |
| Ethylene glycol (g) | — | — | — | — | — | 8.43 |
| PEG400 (g) | — | — | — | 27.2 | — | — |
| HDI (g) | — | — | — | — | 45.7 | — |
| PPG400 (g) | — | — | — | — | 54.3 | — |
| Hardening time | | | | | | |
| Cream (sec) | 20 | 60 | 15 | 40 | 1* | 2* |
| Rise start-up (sec) | 45 | 225 | 18 | 45 | | |
| Rise termination (sec) | 200 | 390 | 23 | 160 | | |
| Density (kg/m³) | 111 | 147 | 173 | 87.2 | | |
| Yellowing property | no | no | no | no | yes | —* |

*As hardening did not occur, observation was omitted.
1* Though the hardening reaction proceeded, yellowing occurred by a reaction heat.
2* Hardening did not occur within 1 hour.

TABLE 4

| | Example | | | | | | | |
|---|---|---|---|---|---|---|---|---|
| | 17 | 18 | 19 | 20 | 21 | 22 | 23 | 24 |
| Formulation | | | | | | | | |
| Prepolymer-I (g) | 100 | 100 | 100 | — | — | — | — | — |
| Prepolymer-J (g) | — | — | — | 100 | — | — | — | — |
| Prepolymer-K (g) | — | — | — | — | 100 | — | — | — |
| Prepolymer-L (g) | — | — | — | — | — | 100 | — | — |
| Prepolymer-M (g) | — | — | — | — | — | — | 105 | — |
| Prepolymer-N (g) | — | — | — | — | — | — | — | 110 |
| Water (g) | 2.34 | 2.34 | 2.34 | 0.73 | 2.06 | 1.35 | 2.98 | 3.36 |
| SA-102 (g) | — | — | — | 2.0 | 2.0 | 2.0 | 3.5 | 3.5 |
| DBU (g) | 0.5 | — | — | — | — | — | — | — |
| SA-1 (g) | — | 0.6 | — | — | — | — | — | — |
| DBN (g) | — | — | 0.4 | — | — | — | — | — |
| SH-193 (g) | 0.2 | 0.2 | 0.2 | 0.2 | 0.2 | 0.2 | 0.2 | 0.2 |
| GL-3000 (g) | 12.5 | 12.5 | 12.5 | 4.46 | 11.1 | 7.5 | 15.7 | 17.7 |
| Hardening time | | | | | | | | |
| Cream (sec) | 15 | 16 | 16 | 15 | 19 | 13 | 13 | 13 |
| Rise start-up (sec) | 20 | 25 | 18 | 17 | 22 | 23 | 23 | 15 |
| Rise termination (sec) | 45 | 68 | 45 | 53 | 70 | 75 | 53 | 35 |
| Density (kg/m³) | 58.4 | 92.9 | 70.9 | 182 | 92.0 | 107 | 71.7 | 134 |

What is claimed is:

1. A method for producing a non-yellowing polyurethane urea foam, which comprises reacting (1) an isocyanate-terminated prepolymer, the prepolymer obtained by the addition reaction of a polyol having a number average molecular weight of 100 to 5,000 and containing on the aver 2 to 3 functional groups with an aliphatic polyisocyanate in an amount of 1.4 to 2.6 times the hydroxyl equivalent, with (2) water in an amount of 0.4 to 5 times the isocyanate equivalent in the presence of, per 100 parts by weight of the prepolymer, either (3)(a) 0.1 to 5 parts by weight of a potassium or sodium salt of a $C_2$–$C_{10}$ alkanoic acid or (3)(b) 0.1 to 10 parts by weight of a diazabicycloalkene represented by the formula (I)

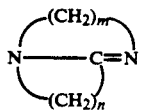 (I)

wherein m is an integer of 3 to 7 and n is an integer of 2 to 4,
or its organic acid salt.

2. The method of claim 1 wherein the polyol has a number average molecular weight of 200 to 3,000.

3. The method of claim 1 wherein the aliphatic polyisocyanate is 1,6-hexamethylene diisocyanate.

4. The method of claim 1 wherein the polyol is addition-reacted with the aliphatic polyisocyanate in an amount of 1.5 to 2.5 times the hydroxyl equivalent.

5. The method of claim 1 wherein the isocyanate-terminated prepolymer is reacted with water in an amount of 0.5 to 4.5 times the isocyanate equivalent.

6. The method of claim 1 wherein the potassium or sodium salt of the $C_2$–$C_{10}$ alkanoic acid is used in an amount of 1 to 3 parts by weight per 100 parts by weight of the prepolymer.

7. The method of claim 1 wherein the diazabicycloalkene represented by the formula (I) or its organic acid salt is used in an amount of 0.4 to 4 parts by weight per 100 parts by weight of the prepolymer.

* * * * *